US012288049B1

(12) United States Patent
Seul

(10) Patent No.: US 12,288,049 B1
(45) Date of Patent: Apr. 29, 2025

(54) CODE FOR CONFIGURING AND POPULATING STRUCTURED DATA CONTAINERS TO AUTOMATE THE CREATION OF (ELECTRONICALLY TRANSMISSIBLE) INFORMATION PRODUCTS AND METHODS OF USE

(71) Applicant: BioInventors & Entrepreneurs Network, LLC, Warren, NJ (US)

(72) Inventor: Michael Seul, Basking Ridge, NJ (US)

(73) Assignee: BioInventors & Entrepreneurs Network, LLC, Warren, NJ (US)

( * ) Notice: Subject to any disclaimer, the term of this patent is extended or adjusted under 35 U.S.C. 154(b) by 0 days.

(21) Appl. No.: 18/393,785

(22) Filed: Dec. 22, 2023

(51) Int. Cl.
*G06F 8/41* (2018.01)

(52) U.S. Cl.
CPC ..................... *G06F 8/41* (2013.01)

(58) Field of Classification Search
None
See application file for complete search history.

(56) References Cited

U.S. PATENT DOCUMENTS

| 8,032,822 B1* | 10/2011 | Artamonov | G06Q 40/123 |
| | | | 715/255 |
| 8,584,008 B1* | 11/2013 | Dulaney | G06F 40/103 |
| | | | 715/252 |
| 9,971,820 B2* | 5/2018 | Bendel | G06F 16/211 |
| 10,482,004 B2* | 11/2019 | Angermayer | G06F 16/22 |
| 11,288,045 B1* | 3/2022 | Hegarty | G06F 9/44521 |
| 11,537,625 B1* | 12/2022 | Slayton | G06F 16/2282 |
| 11,693,852 B1* | 7/2023 | Singh | G06F 16/2448 |
| | | | 707/737 |
| 2007/0044069 A1* | 2/2007 | Doucette | G06F 8/30 |
| | | | 717/106 |
| 2008/0022107 A1* | 1/2008 | Pickles | G06F 40/174 |
| | | | 713/176 |
| 2010/0095289 A1* | 4/2010 | Nguyen | G06F 8/658 |
| | | | 717/169 |

(Continued)

OTHER PUBLICATIONS

Casalicchio, "The state-of-the-art in container technologies: Application, orchestration and security", 2020, wileyonlinelibrary.com/journal/cpe (Year: 2020).*

(Continued)

*Primary Examiner* — Hossain M Morshed
(74) *Attorney, Agent, or Firm* — Eric P. Mirabel

(57) ABSTRACT

Disclosed herein is a PRocess Orchestration and Repository Origination Code ('PROC') for simultaneously configuring a data repository, preferably in the form of a structured data container, and encoding a workflow for populating the data container with items of information from designated decentralized sources of disparate type and format. PROC provides a general-purpose method for compiling, transforming and presenting items of information in a data container according to a preset standard governing structure and content. PROC encodes both the structure of the data container as well as the process for procuring and distributing the intended content. Accordingly, PROC provides a method for the real-time integration of primary data from disparate decentralized sources, including sources dynamically created during Script execution, and items of information derived from primary data, into a persistent or temporary structured container.

20 Claims, 2 Drawing Sheets

(56) References Cited

U.S. PATENT DOCUMENTS

| | | | |
|---|---|---|---|
| 2011/0213857 A1* | 9/2011 | Philipeit | G06F 9/455 709/224 |
| 2011/0289118 A1* | 11/2011 | Chen | G06F 16/86 707/E17.054 |
| 2014/0081924 A1* | 3/2014 | Jennings | G06F 16/1824 707/687 |
| 2015/0254602 A1* | 9/2015 | Hammelbacher | G06Q 10/087 705/28 |
| 2015/0347589 A1* | 12/2015 | Fontebride | G06F 16/9535 707/752 |
| 2017/0093635 A1* | 3/2017 | Sen | H04L 67/1097 |
| 2021/0334390 A1* | 10/2021 | Offor | G06F 21/606 |
| 2022/0121807 A1* | 4/2022 | Seul | G06F 8/30 |
| 2022/0198034 A1* | 6/2022 | Rodriguez | H04L 9/30 |
| 2022/0374218 A1* | 11/2022 | Monteiro Vieira | G06F 8/63 |
| 2022/0382779 A1* | 12/2022 | Ogievetsky | G06F 16/2264 |
| 2024/0273076 A1* | 8/2024 | Seul | G06F 16/282 |
| 2024/0273094 A1* | 8/2024 | Seul | G06F 16/2443 |

OTHER PUBLICATIONS

Libnova, "Create a data container", 2022, https://docs.libnova.com/labdrive/get-started/create-a-data-container (Year: 2022).*

* cited by examiner

CODE FOR CONFIGURING AND POPULATING STRUCTURED DATA CONTAINERS TO AUTOMATE THE CREATION OF (ELECTRONICALLY TRANSMISSIBLE) INFORMATION PRODUCTS AND METHODS OF USE

BACKGROUND

Decentralized ('distributed') data architectures, in contrast to prevalent centralized data architectures such as data warehouses or data lakes, offer the advantage of local ownership of content and control of design, operation and access, while reducing scale and complexity of development and deployment.

The effective operation of a distributed data architecture requires the routine compilation of data from a multiplicity of disparate sources of data and knowledge within such an architecture. Common approaches to this 'data integration problem' include data virtualization (REF: website cio-wiki.org under wiki/Data_Virtualization) by creating a logical ('virtual') data layer representing inputs from disparate primary sources; and data federation (REF: website cio-wiki.org under wiki/Data_Federation), by creating a unified 'view' of such primary sources by executing the requisite multiplicity of queries. These technologies shift the complexity of designing centralized data stores with their Extract-Transfer-Load processes to the design of complex sets of queries and related operations for accessing files, web resources or API payloads, and the management of source connectivity.

In addition to integration, it is the presentation of data, which may comprise data aggregation, transformation and visualization, and their distribution, primarily by electronic transmission, to a multiplicity of disparate recipients, in customized or standardized machine-or human readable formats. This task typically requires the deployment of additional technologies, thereby increasing complexity and cost.

Accordingly, a new way of conceptualizing the organization of data storage, and the creation and distribution of data in standardized formats has received renewed attention (REF: website thoughtworks.com under/content/dam/thoughtworks, and further under documents/books/bk_data_mesh_excerpt.pdf).

In this respect, US20220121807A1 ('Programmatic Creation of Dynamically Configured, Hierarchically Organized Hyperlinked XML Documents For Presenting Data and Domain Knowledge From Diverse Sources," incorporated by reference) discloses a special-purpose language, termed jCode, and related methods for programmatically assembling a hierarchically organized document from items of data and knowledge acquired from disparate sources. However, while jCode provides convenient abstractions of data access functionality into simple instructions, the configuration of the hierarchically organized document comprising data and knowledge statements must be specified in a separate configuration table or related document. Further, in a jCode instruction, of the form 'function: argument', 'function' is one of a given set of defined functions known to the jCode processor, which set can be extended only by a jCode developer. Finally, jCode instructions are designed to be memoryless, with the advantage of supporting the bundling of instructions into directives in any order, but the disadvantage of requiring intermediate data storage when devising a workflow comprising a sequences of operations.

The need therefore exists to provide practical solutions for the programmable creation of hierarchically structured data containers, including documents, in accordance with the aforementioned and related new conceptualizations, that is: for devising and executing processes or workflows, for end-to-end or staged retrieval and compilation of data, by real-time access to decentralized sources, and distribution of aggregated or otherwise transformed data and related information, in standardized formats to interested parties.

SUMMARY

Disclosed herein is a PRocess Orchestration and Repository Origination Code ('PROC') for simultaneously configuring a data repository, preferably in the form of a structured data container, and encoding a workflow for populating the data container with items of information from designated decentralized sources of disparate type and format.

PROC provides a general-purpose method for compiling, transforming and presenting items of information in a data container according to a preset standard governing structure and content. PROC encodes both the structure of the data container as well as the process for procuring and distributing the intended content. Accordingly, PROC provides a method for the real-time integration of primary data from disparate decentralized sources, including sources dynamically created during Script execution, and items of information derived from primary data, into a persistent or temporary structured container.

In certain embodiments, the container populated in a first workflow becomes the source of information for a second workflow. In other embodiments, PROC is a DocumentOriginationCode ('DOC') for populating structured data containers configured in accordance with requirements for formal documents such as business reports, or clinical reports or related administrative and other documents in various prescribed formats. DOC execution yields a transmissible information product.

PROC is provided in the form of a Script that conforms to a key: value pair syntax, preferably JSON. Scripts are executed by a PROC Interpreter (herein also: Interpreter, PROC Processor, or Processor), which is a program in a high-level programming language that preferably supports objects; in a preferred embodiment, the PROC Interpreter is a JavaScript program (JS, conformant to ECMAScript version 6 or higher REF: website 262.ecma-international.org under 6.0). PROC Script execution produces a populated structured data container in a format that may be stored in a database designed for handling structured documents, or transmitted to interested parties by standard electronic transmission protocols via serialization and de-serialization.

1 NCI cancer.gov website, under about-cancer and further under treatment/types/targeted-therapies/approved-drug-list #targeted-therapy-approved-for-lung-cancer;

2 NCI cancer.gov website, under about-cancer and further under treatment/drugs/osimertinib; #3 dailymed.nlm.nih.gov website, under/dailymed/drugInfo and further under 'TAGRISSO-osimertinib', for professional audience;

4 NCI cancer.gov website, under about-cancer, and further under treatment/clinical-trials/intervention, and further under osimertinib;

5 clinicaltrials.gov website, under/ct/OSIMERTINIB;

6 Medline Plus website, under vsearch.nlm.nih.gov/vivisimo, search term 'Osimertinib'; and

7 fda.gov website, under medical-devices/in-vitro-diagnostics, and further under/list-cleared-or-approved-companion-diagnostic-devices-in-vitro-and-imaging-tools.

Figure 3:
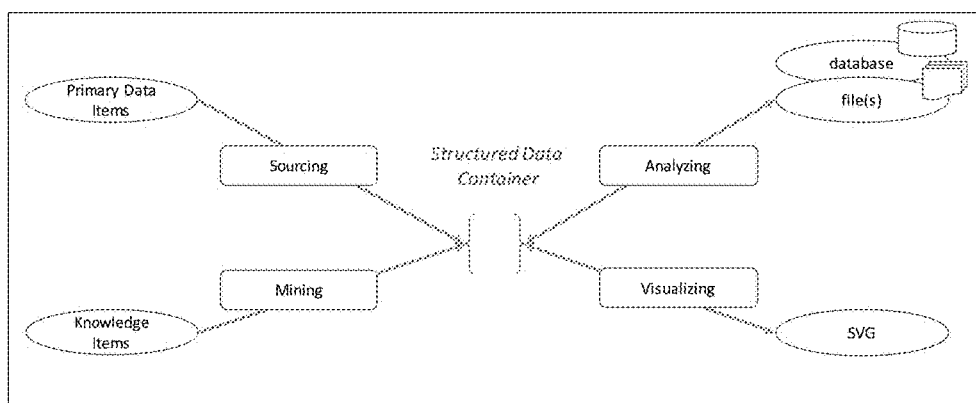

FIG. 3 is a graphical illustration of a distributed process comprising the deployment of software agents for sourcing, mining, analyzing and visualizing, coordinated in accordance with a PROC Script, the agents populating a structured data container encoded by said Script.

BRIEF DESCRIPTION OF SOME OF THE TABLES

Table Ex1.1—Fragment of PROC Script illustrating elements for configuring and populating a structured data container; the structure and content of subsection 's102' is analogous to that of subsection 's101', but is not shown here given limited space; the tilde in the path notation marks items for eventual deletion from the populated structured data container; relating to Example 1.

Table Ex1.2—Flattened, path-encoded WorkingObject representing the PROC Script in Table Ex1.1, now also displaying the content of subsection 's102.'

Table Ex1.3—Populated structured data container, encoded by the script in Table Ex1.1, obtained by filtering the complete WorkingObject produced during script execution (aka the ProcessLog), by removing entries with paths marked '_' or '~'.

Table Ex1.4—Un-flattened filtered data container in Table Ex1.3.

Table Ex2.1—Fragment of PROC Script illustrating several additional PROC functionalities; relating to Example 2.

Table Ex2.2—R Script referenced in the PROC Script of Table Ex2.1.

Table Ex2.3—Database table created by R Script execution, holding R script command line arguments; exported from SQLite Database.

Table Ex2.4—Populated structured data container encoded by the PROC Script in Table Ex2.1.

Table Ex2.5—Un-flattened structured data container in Table Ex2.4.

Table Spec.1—Recursive implementation of higher-order functions procMap, procFilter and procReduce.

Table Ex6.1—A first PROC Script, in a staged process, encoding a first structured data container; relating to Example 6.

Table Ex6.2—A second PROC Script, in a staged process, comprising a templated jCode directive.

DETAILED DESCRIPTION

It is to be understood that both the foregoing general description and the following detailed description are exemplary and explanatory and are intended to provide further explanation of the invention as claimed.

Unless otherwise defined, all technical and scientific terms used herein have the same meaning as commonly understood by one of ordinary skill in the art to which this invention belongs. Still, certain elements are defined for the sake of clarity and ease of reference.

Definitions

The following terms are used herein as follows:
Key: Value Pair Syntax is a notation for assigning a value to a key, as in JavaScript Object Notation ('JSON') and related object notations, and in related data structures such as a JavaScript Map or a Python dictionary;
Key refers to the first element of a key: value pair, as in JSON, or in a corresponding data object;
Path is a key in a flattened representation of a nested object, in the form of string comprising the preferably dot-separated sequence of nodes traversed, starting from the root, to reach a specific node in the tree representing the original nested object;
Path-Encoded, as in path-encoded object, refers to an object whose keys are in the form of paths;
Structured, as in structured data container, refers to a data container with hierarchical organization, represented by a nested object; structured also may refer to 'flat', or un-structured, as a special case; and
WorkingObject is a flattened, path-encoded representation of a nested object represented by a PROC Script of the invention.

1—Elements of the PRocess Orchestration & Repository Origination Code

The PRocess Orchestration and Repository Origination Code ('PROC') of the invention is provided as a PROC Script, herein also Script, preferably in the form of a JSON file, whose hierarchical structure encodes the configuration of a structured data repository, also referred to herein as a structured data container, while its sequence of instructions encodes a process, herein also PROC Workflow or Workflow, for populating the data container. PROC Workflows comprise such operations as data compilation, transformation, presentation and transmission; they are executed by a special program referred to herein as the PROC Interpreter.

PROC comprises templated (aka 'parametrized') statements and expressions, wherein templated statements and expressions comprise: variables of a first type, referred to herein as update variables, that are instantiated by referencing values provided or created elsewhere in the Script; variables of a second type, referred to herein as substitution variables, that are instantiated by substituting for them values provided or referenced in the Script; and references to user-defined functions (or function expressions) that are invoked by the PROC Interpreter.

The use of these variables makes PROC Scrips compact and transparent; the ability to define, register and invoke user-defined functions, and to refer to function return values via update variables, makes PROC Scripts executable. PROC Script execution populates the encoded structured data container.

1.1 Variables

An update variable (aka updateVar or uv) is a string of the form '_&uvName&_', identified by paired delimiters '_&' and '&_'; an updateVar may be an element of an array, e.g. ['William',_&MiddleName&_, 'Yeats'] or may be embedded in a string, e.g. 'SELECT &otherItems&_ from _&anotherTable&_'; a templated string of this type, also referred to herein as an update VarExpresssion, is expanded into a standard form, as disclosed herein below; uvName matches (or partially matches) the key or path of an upstream entry in an object, notably including a WorkingObject, as defined herein; that is, an updateVar provides a back-reference to the value stored under that key or path and thus represents a pointer into the address space of the object defined by the subset of keys or paths upstream of the updateVar or update VarExpr in question; the introduction of update Vars endows PROC with the functionality of referencing values that are dynamically created during Script execution, as disclosed and illustrated herein.

A substitution variable (aka subVar or sv) is a string of the form '_@svName@_', identified by paired delimiters '_@' and '@_'; a subVar may be an element of an array, e.g. ['X', 'Y', '_@Z@_'] or may be embedded in a string, e.g. 'SELECT _@thisItem@_ FROM _@thatTable@_', also referred to herein as a subVarExpression; as with template literals REF: developer.mozilla.org website, under/en-US/docs/Web/JavaScript/Reference/Template_literals, or framing text introduced in REF: US20220121807A1 (incorporated by reference), a subVar is instantiated by replacing it with a value bound to svName, provided or referenced in the Script.

Optionally, temporary placeholders may be defined, denoted ' . . . ', preferably intended to be instantiated by values interactively provided by a user.

1.2 Functions

Function Dispatch—Critical to PROC Script execution is the invocation of user-defined functions, specified in the Script by name or by an alias. In a preferred embodiment, the PROC Interpreter invokes user-defined functions by reference to a function dispatch object ('fnDisp'); to that end, functions are registered in fnDisp by recording function names under a key representing that function name or an alias.

Registration of new functions, by updating fnDisp, preferably is accomplished by a suitable utility. In a preferred embodiment, wherein the PROC Interpreter is a JavaScript program, fnDisp is created and updated programmatically, in a first module that imports relevant function references from other modules; second modules then reference fnDisp by a destructuring assignment referencing the first module, thereby obviating the need to pass fnDisp as an argument to individual functions. Under appropriate precautions, the nodeJS global object also may be used to this end.

Extensibility—This fnDisp registration mechanism renders the set of user-defined functions extensible, in any of the categories below or additional categories as may be of interest.

Function Reference Syntax—In a preferred embodiment, a function reference has a standard structure, namely that of an object bound to a user-created key, the object having a first property, preferably under a key fn that is paired with the name or alias by which the function of interest was registered (or an updateVar referencing that name or alias), and a second property, preferably under a key args that is paired with an object holding function arguments. These must be provided in accordance with the function definition, that is: as a literal, an array with elements in the expected order; or an object with the expected properties. The PROC Interpreter records the value returned by the function (generally an object) under the user-created key, thereby updating the WorkingObject.

Categories—PROC Scripts reference user-defined functions of several type, including but not limited to:
GET ('fetch') Functions, such as:
fetchContent, for sourcing content from files or web resources, as illustrated in Example 1; in a preferred embodiment wherein the PROC Interpreter is a JavaScript program, this function is implemented by way of multi-method dispatch on the uri scheme (e.g. file or url) and, for files, on the file extension; in a preferred embodiment, the function is referenced according to this pattern:
"Data": {
"fn":"fetchContent",
"args": {"uri": "file:///C: . . . "}
}
wherein the argument is in the form of an object defining the uri, here pointing to a file in the local file system; fetchFromDb, for querying a local data base table, preferably is referenced according to this pattern:
"dbSourcedData": {
"fn":"fetchFromDb",
"args":{"uri":"_&s1.s101.~scriptOutpURI&_","q":
"SELECT items FROM_&s1.dbTable&_"},
}
wherein arguments are provided in the form of an object having a first property, labeled by uri, identifying the uri of a local SQLite database; and a second property, labeled by q, specifying the query to be executed; here, the values of both properties are identified by back-reference to properties presumed present upstream of this function reference, as further illustrated herein below;
fetchByAPI, for accessing services by submitting GET or POST requests to a REST-API, according to this pattern, with arguments described in more detail in Example 2:
"apiSourcedData":{
"fn":"fetchByAPI",
"args":{"api":"_&api&_","s1.sourceDb":
"_&s1.sourceDb&_",
"impQ":"_&s1.s101.sectionContent.impQ&_",
"destDb":"_&s1.sourceDb&"
}
}
In a preferred embodiment wherein the PROC Interpreter is a Javascript program, the function ultimately invokes fetchAPI and async-await, and preferably top-level await REF: developer.mozilla.org website under/en-US/docs/Web/JavaScript/Reference and further under/Operators/await #top_level_await; PUT Functions, the counterparts of GET functions, for placing items of information into a designated data store. That is, a function putContent writes to a pre-specified file, a function putToDb populates a designated database table by invoking CREATE, INSERT or UPDATE queries in a manner analogous to the invocation of SELECT queries in fetchFromDb. In one embodiment, a function putByAPI optionally may be explicitly defined. In a preferred embodiment, the function fetchByAPI handles both GET and POST requests.
Special Functions, for implementing operations comprising:
subVar instantiation-exemplified by the function inst2, which takes two arguments, namely a first argument, preferably identified by a key with suffix Label, comprising a subVar or subVarExpression, i.e. a string comprising one or more substitution variables, and a second argument, preferably identified by a key with suffix Data, comprising an array of values corresponding to any substitution variables in the expression under Label, wherein these values may be literals or updateVariables, that are provided in, or may be sourced into, or dynamically created and recorded in the Script; as an alternative to inst2, a function inst may be defined that accepts an object with properties corresponding to the pair of arguments;

Control Flow: conditional branching—exemplified by the function ifelse, which implements the ternary operator, z=if (cond) x else y, and thus enables conditional branching; for example, in JS, wherein cond may be a logical constant or an expression:
```
const ifelse=(args)=>{
    let cond=(args instanceof Array)?args[0]: args.cond;
    cond=(typeof cond==='string')?eval(cond):cond;
    let x=(args instanceof Array)?args[1]:args.x;
    let y=(args instanceof Array)?args[2]:args.y;
    return (cond)? x: y
}
```
Control Flow: loops—exemplified by the function While, implementing a while loop, iteratively or recursively, the latter illustrated in the JS code below, that accepts an array of arguments comprising: a reference to a user-defined function, or a function expression to be evaluated; an expression comprising a condition to be evaluated and tested, and optional additional arguments, as follows:
```
const While=(fn, cond, n, Lambda=true)=>{
    if(Lambda){
        Lambda=false;
        fn=(fn in fnDisp)?fnDisp[fn]:eval(fn);
    }
    if(eval(cond)) return n;
    return while(fn, cond, n+1);
}
```
In the context of the present invention, this function is particularly useful for monitoring remote data stores for a pre-specified condition or event, as illustrated here, in JS, wherein While ("(n)=>n+1", "pollEvent (20,24)", 1)) returns the number of draws of a random number in the range 1:24 to the first success of exceeding the thres=20:
```
const getRandomInt=(max)=>Math.floor(Math.random( )*max)
const pollEvent=(thres, max)=>(getRandomInt (max)>thres)?true:false
console.log(While("(n)=>n+1", "pollEvent(20, 24)", 1)));
```
As shown, While accepts a function reference or, as shown here, a function expression as an argument, and in that sense is akin to a higher-order function, disclosed herein below.

Electronic Transmission—sendPROC and receivePROC functions, for sending or receiving PROC Scripts, in their original or in populated form, via serialization and deserialization; in a preferred embodiment wherein the PROC Interpreter is a JavaScript program, these user-defined functions invoke JSON.stringify and JSON.parse, which are natively provided to that end.

Creating a new function reference, in the form of a special object, by invoking the function createNewFnRef, for example, in JS:
```
const create NewFnRef=(newFnName, newFnArgs, fn='fn', args='args')=>{
    let fnRef=new Object;
    fnRef[fn]=newFnName;
    fnRef[args]=newFnArgs;
    return fnRef;
}
```

The creation of new function references during script execution is akin to the functional programming concept of creating a function that returns a new function; especially in combination with conditional branching, this extends the expressivity of PROC.

Expanding varExpressions—to transform an expression comprising variables, and specifically updateVars, into a standard syntactic form recognized by the PROC Interpreter, the user-defined function expandVarExpr performs a syntax substitution ('expansion'); for example, in JS, this function detects and transforms the update VarExpression:
'SELECT_'&theseItems&_from_&thatTable&'
by creating a new function reference object referencing inst2:
```
{"fn":"inst2",
"args":{
    "Label":"SELECT_@theseItems@_ from_@thatTable@_",
    "Data":["_&theseItems&_","_&someTable&_"]
    }
}
```
That is: the updateVarExpr is transformed to a subVarExpr, wherein updateVars are replaced by corresponding subVars, and the subVarExpr is placed into the args property of the new function reference object, under the key Label, while the original updateVars are likewise placed into the args property of the new function reference object, as an array under the key Data.

The new function reference is inserted into the WorkingObject, under the key or path of the original varExpression, by invoking the function createNewFnRef (whereupon the WorkingObject is re-flattened); instantiation of the updateVars in this standard context is then performed by the PROC Interpreter by back-reference to matching upstream keys or paths.

As the transformation implementing the desired syntax substitution is performed by a user-defined function, the set of varExpressions handled by such syntax transformation is extensible.

Executing external scripts—by spawning child processes, to launch external R scripts, to perform analysis and transformations of primary data, and to ingest transformed data into the WorkingObject, as illustrated in Examples.

Application-specific functions—any function created within the context of a specific applications, once registered in the function dispatch object, may be referenced in PROC Scripts, as illustrated in Examples.

Higher-Order & Anonymous Functions PROC acquires an additional layer of functionality by supporting higher-order functions (REF: website en.wikipedia.org website under/wiki/Higher-order function), including but not limited to Map, Filter and Reduce; higher-order functions provide a useful abstraction of common patterns of transforming an array (aka vector) or a list, and as with abstractions in general, simplify the syntax.

User-defined functions procMap, procFilter & procReduce preferably are implemented recursively following the standard pattern, e.g. REF: "Structure and Interpretation of Computer Programs", Abelson & Sussman, 2nd Edition, The MIT Press, Cambridge, MA 1996, Chapters 1.3 & 2.2; in one embodiment, wherein the PROC Interpreter is a JavaScript program, such an implementation (distinct from the native JavaScript array methods) is shown in Table Spec.1, wherein:

fn represents the name or alias of a registered user-defined function of interest that is to be applied to the elements of the array arr;

farr denotes the resulting array; in procReduce, acc accumulates the result (such as the sum of an array of numbers) of applying fn to (pairs of) elements of arr; and pacc records the intermediate results (such as partial sums) which may be returned as an array.

Table Spec.1

```
const procMap=(fn,arr,farr)=>{
  if(arr.length===0) return farr;
  return procMap(fn,arr.slice(1),farr.concat(fn(arr[0])]));
}
//console.log(' . . . squaring array elem:',proc
  Map((x)=>{return x*x},[1,2,3,4],[ ]));//1 4 9 16
const procFilter=(fn,arr,farr)=> {
  if(arr.length===0) return farr;
  (fn(arr[0]))?farr.push(arr[0]):farr;
  return procFilter(fn,arr.slice(1),farr);
}
//console.log(' . . . filter to rm odd numbers:', procFilter
  ((x)=>x%2===0,[1,2,3,4,5,6],[ ]));//2 4 6
const procReduce=(fn,arr,acc,pacc,Accum=false)=>{
  if(arr.length===0) return (Accum)?pacc:acc;
  (Accum)?pacc.push(fn(acc,arr [0])):pacc;
  return procReduce(fn,arr.slice(1),fn(acc,arr[0]), pacc,
    Accum);
}
//console.log(' . . . factorial:', procReduce(prod,[1,2,3,4],
  1,[ ],true));//[1, 2, 6, 24]
```

As with all user-defined functions, the function fn is invoked by name or alias; in a preferred embodiment, and presumed here, fnDisp is provided as a module-scoped variable (as described above), and fnDisp is omitted from the argument list.

Anonymous Functions—In one embodiment, higher-order functions, in lieu of a function reference, also accept any valid expression that evaluates to a function, such function expressions conforming to the programming language of the PROC Interpreter, thereby providing the added flexibility of defining anonymous functions within the PROC Script itself, rather than defining and registering a new user-defined function. The Script fragment in Example E.3 illustrates that even a sequence of complex operations may be expressed in compact and transparent form by invoking higher-order in combination with anonymous functions.

1.3 Formatting Instructions formatting of function arguments and return values, exemplified by:

argsAsObj, of type Boolean, which, if set, directs the Interpreter to pass function arguments as an object, rather than as an array (the default mode);

valAsObj, of type a Boolean, which, if set, directs the interpreter to preserve an object returned by a function, rather than by default flattening or otherwise post-processing it; and toArr, indicating the splitting of an array of strings, at the separator specified as the value, e.g. "toArr": "%", wherein that separator must be included in the subVar or other expression in question, as illustrated in Examples.

filtering of WorkingObject, exemplified by:

interactive path-editing by inserting an infix tilde ("~") to indicate removal of entries at the level of the tilde and levels below; and programmatic path-editing, by pre-pending an underscore ("_") to mark 'consumed' entries.

The use of these elements in actual PROC Scripts will be illustrated herein below with reference to Figures and Examples.

2—Script Execution

The order of steps in executing a PROC Script must ensure that any value referenced by an updateVar or by a subVar be available in the WorkingObject by the time it is needed. This fundamental requirement generally dictates the order of function calls as these create new entries in the WorkingObject that are referenced by down-stream updateVars and eventually subVars. It further dictates that updateVars generally be instantiated prior to subVars, as, in a typical pattern, the latter are instantiated by substitution of values referenced by the former.

Figure 1:
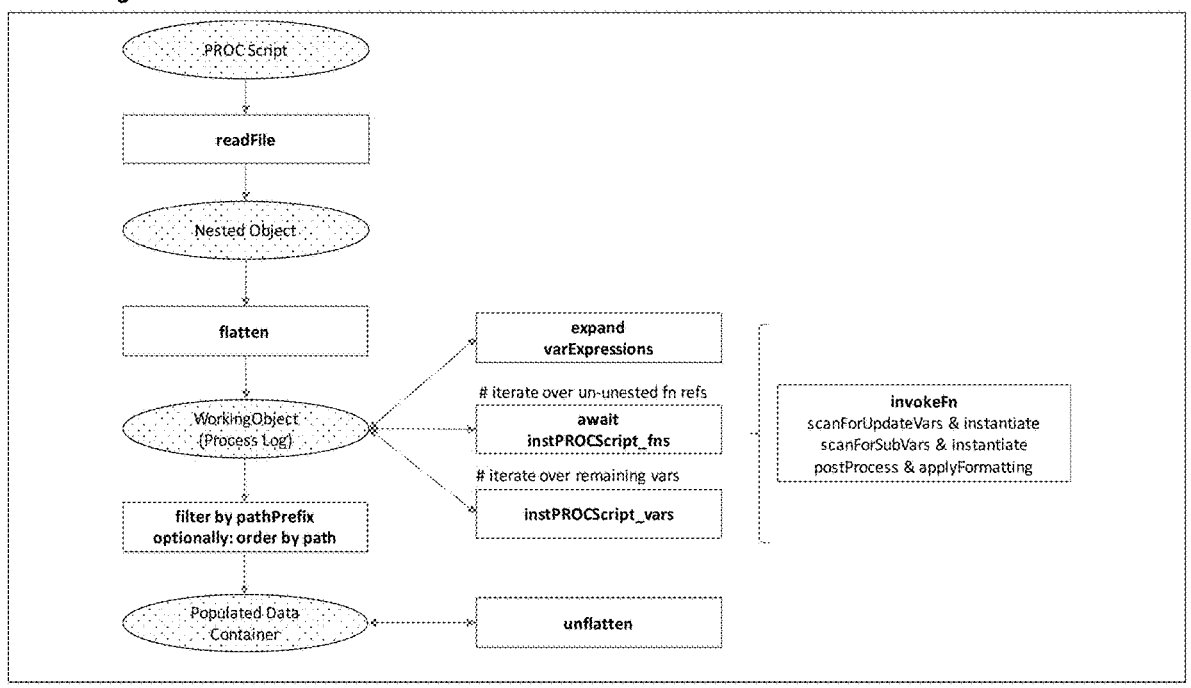
FIG. 1 is a data flow diagram, in the form of a bi-partite graph, for the generic PROC execution model, where rectangles indicate operations and ellipses indicate objects.

Accordingly, to execute a PROC Script, the PROC Interpreter performs a sequence of steps, further illustrated in FIG. 1, comprising:

read the Script, and map it to a (nested) object flatten and path-encode the object to create a WorkingObject detect and expand special varExpressions and update the WorkingObject detect function references and if nested, un-nest these; then, proceeding in order of the new call sequence:

detect and instantiate updateVars in the selected function reference detect and instantiate sub Vars in the selected function reference execute the selected function, by referencing the fnDisp object post-process, and where indicated format, the function return value; and record it in the WorkingObject detect & instantiate remaining update Vars and subVars not associated with function references optionally: save final WorkingObject, which represents a complete Script execution log filter the execution log by removing entries with paths marked for deletion optionally: order the filtered object by path and un-flatten (to create a nested object)

optionally: save to local or remote data store

Noteworthy aspects include:

Nested Function References—Function references may be nested, akin to function composition (REF: en.wikipedia.org/wiki website under Function_composition_ (computer_science)). In accordance with the fundamental requirement above, the PROC Interpreter 'un-nests' nested function references, to ensure that the value returned by the 'inner' function is available to the 'outer' function; this is akin to method chaining (as in Javascript) or 'piping' (as in R or Python). These and other aspects of Script execution are illustrated in Examples.

Dynamic Updating—Function return values, typically in the form of objects, are recorded in the WorkingObject, which thereby is continually updated during Script execution; this makes it possible for updateVars to reference entries in the WorkingObject that, while they do not exist in the original Script, are created during Script execution.

Process Execution Log—The evolving WorkingObject represents a record ('log') of the sequence of process steps performed in populating the data container; concurrently with dynamic updating, the PROC Interpreter marks as 'consumed', preferably by pre-pending an underscore, '_' to the corresponding paths, any entries in the WorkingObject referenced during execution, as illustrated in Examples.

Selection of Content and Shaping of Data Container: Filtering & Unflattening—To facilitate the removal, from the process log, of temporary entries not to be retained in the final data container, Script designers may mark keys of the original nested object encoded by a PROC Script, at any level, by a tilde C ~ '), such that entries at or below the level so marked are to be removed along with those marked during Script execution.

3—Illustrative Applications

The methods of the present invention broadly apply to the programmatic implementation of business administrative processes comprising compiling, aggregating, transforming, analyzing or visualizing items of information from disparate sources into a structured data container, and conveying or presenting the structured data container, in a primary format, preferably JSON, as disclosed herein, optionally to be transformed into, or rendered in secondary formats.

In a preferred embodiment, PROC Script execution, including filtering and optional un-flattening, produces a primary transmissible information product, preferably in JSON, capable of being transformed to secondary formats for distribution to electronic data systems designed to accommodate specific formats, such as, in the clinical setting, the Fast Healthcare Interoperability Resources ('FHIR') format, or rendered in human-readable formats, such as HTML. A structured data container, configured by and populated in accordance with a PROC Script reflecting standards established by the owners of the data being transmitted and other interested parties represents an instance of an information product.

In one respect, configuring structured data containers of standardized structure and content, and programmatically populating these by executing PROC Scripts of the invention illustrates the utility of PROC as a DocumentOriginationCode ('DOC'). In that respect, a PROC Script provides a method for automating the production of clinical laboratory reports, the reports comprising primary data sourced by invoking fetch functions, and further comprising additional items of information, derived from the primary data, such as by R scripts implementing the methods of analysis in Examples 4 & 5, or otherwise relating to the primary data, and included in the report document to aid interpretation and inform decision-making.

In preferred embodiments, PROC operates in tandem with server-side services, by way of REST-APIs exposing functionality in the form of jCode instructions and directives REF: U.S. Pat. No. 20,220,121807A1 ("Programmatic Creation of Dynamically Configured, Hierarchically Organized Hyperlinked XML Documents For Presenting Data and Domain Knowledge From Diverse Sources"), as in the 'Staged Processing' Example, below.

For illustrative purposes, several specific applications are disclosed as follows.

3.1—Using PROC

Example 1, with reference to Tables Ex1.1—4, illustrates the use of several PROC elements, including the creation of a flattened, path-encoded WorkingObject, the use of subVars and updateVars, and the invocation of functions by reference, as well as several aspects of PROC Script execution, including dynamic updating, the creation of a process execution log and the flagging of entries to be excluded from the final data container.

3.2—Data Analysis by Deploying External Scripts

At a next level of complexity, PROC provides the functionality to compactly and transparently encode workflows for data compilation, transformation and presentation, optionally including visualization, wherein specific tasks of data analysis preferably are delegated to application-specific external processes with access to suitable task-specific tools, and results generated by such external processes are consumed in the workflow and integrated into the data container configured in the PROC Script.

Example 2, with reference to Tables Ex2.1—4, illustrates additional PROC functionality to that effect, including: spawning an external R script (REF: R-project.org/website) as a child process, by way of a user-defined function runScript, to autonomously perform a specific task with arguments provided within the PROC Script, wherein this function may write data to the file system or to a local or remote database, and return a value in the form of an object that is consumed during the further PROC Script execution; nesting of function references and their execution after un-nesting; conditional branching, by way of the user-defined function ifelse; dynamically created new function references, by way of the user-defined function createNewFnRef; and derived expressions, generated by expanding update VarExpressions.

The nesting of function references illustrated in the Example represents a pattern of instantiating a subVarExpression, wherein the expression itself, recorded under Label or requisite items of data, recorded under Data (or both) are retrieved from the same or different internal or external sources, for example a SentenceClassLabel and related SentenceClassData from a SentenceClass database, as disclosed in REF: US20220121816A1 ("Semantic data acquisition, storage and presentation system" incorporated by reference), and wherein the fetch function reference may itself comprise update Vars:

```
"fn":"inst2",
"args":{
    "Data":{
        "fn":"fetchFromDb",
        "args":{
            "uri":"_&dataSrcURI_backRef&_",
            "q":"_&data_SQLQueryExpr&_"
        },
    },
    "Label":{
        "fn":"fetchFromDb",
        "args":{
            "uri":"_&labelSrcURI_backRef&_",
            "q":"_&label_SQLQueryExpr&_"
        },
    }
}
```

The Example further illustrates a workflow pattern for generating, and then retrieving, derived or transformed data, wherein this and other workflow patterns may themselves be incorporated into larger workflows. Scripts or programs in other languages, providing native support or libraries well suited to specific tasks of interest may be similarly deployed, receiving input from the PROC Script, and returning to the PROC Script specified output, while writing additional output to specified locations in the file system or to a specified database or other data store for subsequent retrieval. Example 3 illustrates the use of Higher-Order Functions, provided in PROC as part of the extensible set of user-defined functions, to facilitate the design and implementation of larger, more complex workflows, in accordance with the present invention.

Figure 2:
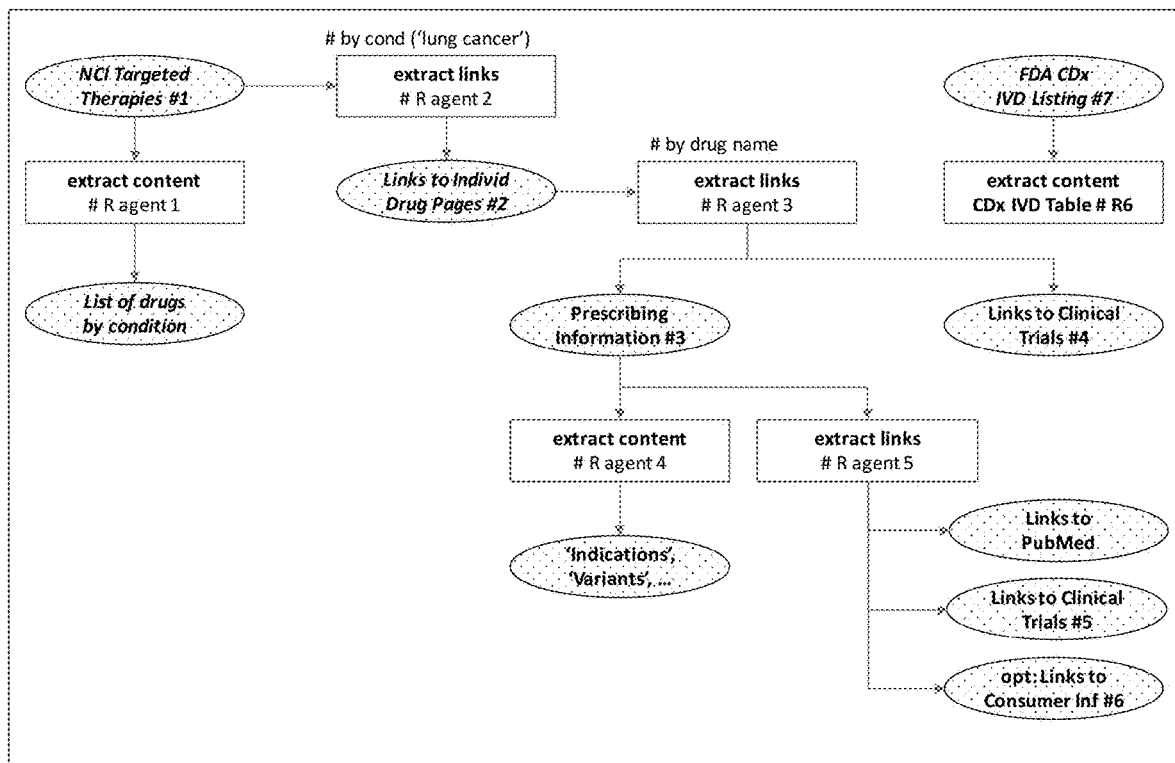
FIG. 2 is a data flow diagram, in the form of a bi-partite graph, relating to Example 5, illustrating the operation of several R scripts for mining web resources; rectangles indicate actions, ellipses indicate data objects; abbreviations: CDx=Companion Diagnostics, IVD=In VitroDiagnostics; numbered references.

Examples 4 & 5, the latter with reference to FIG. 2, describe generalizations of the workflow pattern introduced in Example 2 to implement the integration of data compilation and analysis of gene expression and gene variant data, commonly produced in the setting of clinical molecular oncology, by invoking application-specific R scripts.

3.3—Distributed Processing

Generalizing Example 5, PROC Scripts of the present invention provide a method for orchestrating and coordinating the operation of several external programs, such as R (or other) scripts; that is, a PROC Workflow is designed so as to invoke one or more external scripts or programs, all launched as child processes in accordance with the governing Script, directing outputs produced by the external programs to a shared (temporary or persistent) data container.

In a preferred embodiment, a multiplicity of external programs or scripts, launched in accordance with a workflow encoded in a first PROC Script to perform different tasks, interact with a (temporary or permanent) structured data container, as illustrated in FIG. 3, wherein the said data container is configured in the first or in a second PROC Script. In one respect, the coordinated operation of such external programs and scripts performing tasks on behalf of the governing PROC Script is akin to the operation of software agents.

In a preferred embodiment, wherein the PROC Interpreter is a JavaScript program, the PROC Script invokes user-defined functions providing additional levels of control, beyond that of the synchronous execution implemented in runScript, in Example 2; that is, agents handling a tasks of a first type, comprising sourcing and mining, are executed asynchronously, and agents handling tasks of a second type, comprising analyzing or visualizing, that, when applied to sourced or mined data, must await the completion of the former, are triggered upon an agent of the first type completing its task.

In one embodiment, the PROC Interpreter, upon completion of a cycle of agent-performed operations, accesses the intermediate data store as the sole source for populating the Script, or for providing an intermediate data repository supporting subsequent operations in a larger workflow.

3.4—Staged Processing & Invoking External Services: the PROC JOIN Operation

In a further respect, PROC supports staged processing, wherein a first structured data container, populated by executing a first workflow, becomes the source of compiled inputs for populating a second data container, by executing a second workflow.

Example 6 illustrates this PROC use case with reference to Tables Ex6.1—4; here, the first data container serves as the repository of inputs for instantiating a jCode directive comprising a sequence of templated jCode instructions (REF: US20220121807A1, incorporated by reference), provided in the second data container, which here has a flat structure. In this example, the step of populating the second data container comprises a PROC JOIN operation linking it to the first data container, the operation so named in view of its similarity to a SQL JOIN.

In one embodiment, the instantiated jCode directive is submitted, as part of a POST-request to a REST-API that exposes certain functionalities for creating and querying a remote data store, including a data store using a generic tabular representation of disparate types of data, and for selecting and transforming data, for example to transform data imported in generic tabular representation so as to recover a wide tabular format. In this respect, the first step comprises the dynamic creation of SQL expressions for importing and transforming data from such a remote data store. In a preferred embodiment, a PROC Script encoding this further step, references the user-defined function fetchByAPI.

4—Script Design & Deployment 4.1—Script Design: Separation of Tasks

The Script of the invention, while combining design and production functionality, enables the separation of the tasks of designing and producing Scripts, wherein: the former is undertaken by a designer, focusing on the hierarchical organization of content presentation, in the populated data container, as in embodiments of PROC as a DocumentOriginationCode, documents; and wherein the latter is undertaken by a producer, focusing on the requisite workflow; accordingly:

a designer, with domain-specific knowledge regarding form and content of a desired document, who may not have the requisite technical expertise to identify the location of specific information, or methods of accessing that information, creates a first version of the script capturing the intended layout, by specifying at least keys of intended key: value pair elements-for example: to encode specific mandatory sections of a clinical report for presenting information including: details of the laboratory that performed the ordered test; the presentation of test results; the interpretation of these test results; the description of test methods; and a signature by an authorized person.

a producer, with knowledge of the requisite data sources and systems, who may not have the domain-specific knowledge of the designer, adds the missing information to the Script, for example by specifying paths or links to requisite content or to requisite destinations.

In addition, an administrator and a developer, who may or may not be the same individual, and who may or may not be members of the same organization as designer and producer, maintain the Script repository and the PROC Interpreter, respectively.

Aided Design & Production—In one embodiment, the activities of designer and producer are supported by 'automated assistants', for example to provide access to a repository of common PROC patterns, or entire PROC Scripts, and further by tools to verify conformance to syntax rules and to the Script execution model. In a preferred embodiment, such tools include a JSON Schema for each type of PROC Script.

Script Repository—New PROC Scripts, especially when encoding standardized information products intended for distribution, preferably will be reviewed and finalized by an authorized expert panel and maintained prior to submission to a repository that will be accessible to authorized users, as envisioned, for example, in a 'federated governance' model (REF: website mesh-ai.com under/blog-posts/data-mesh-101-federated-data-governance).

4.2—PROC Deployment

In one embodiment, the methods of the invention are deployed locally, requiring, in a minimal installation, only an editor, such as Notepad++ (REF: notepad-plus-plus.org/website) to create PROC Scripts, and a run-time environment for the PROC Interpreter to execute Scripts. To extend the set of user-defined functions would minimally require only an editor supporting the programming language of the interpreter, preferably JavaScript.

In another embodiment, Script execution is provided in the form of a remotely hosted service, which may be a cloud-hosted service, wherein that service preferably is invoked by way of a REST-API minimally exposing just one end-point, namely to execute uploaded PROC Scripts and return the populated Script to the user.

In a preferred embodiment, the local installation or the remotely hosted service will interact with other remotely hosted services, notably the REST-API exposing jCode instructions and directives for managing remote data resources, as illustrated in Example 6.

EXAMPLES

E.1 A Basic Workflow Pattern: Invoking Key Elements

The PROC Script fragment in Table Ex1.1, in the form of a nested object represented in JSON, encodes a structured data container comprising a first section, 's1', which in turn comprises subsections 's101' and 's102'; simultaneously, the Script encodes a sequence of steps for populating that data container, starting with the creation of a WorkingObject, a flattened, path-encoded representation of the original Script (including subsection 's102'), as shown in Table. Ex1.2.

TABLE Ex1.1

```
{
  "DOC":{
    "s1": {
      "SectionName":"Header",
      "Title": "Gene Expression Analysis",
      "~sourceConf":{
        "dbFilePath":"C:/Users/.../myDb.sqlite",
        "dbURIScheme":"odbc"
      }
      "~sourceURI":{
        "fn":"toUri", "args":{"dbFilePath":"_&s1.~sourceConf.dbFilePath&_",
            "dbURIScheme":"_&s1.~sourceConf.dbURIScheme&_"}
      },
      "dbTable": "GeneExprAnalysis_metaData",
      "s101":{
      "Title": "Laboratory Information",
        "sectionContent":{
          "~impQ":{
            "fn":"inst2",
            "args":{
              "Label": "SELECT propertyValue FROM _@dbTable@_ WHERE property IN ('_@X1@_','_@X2@_','_@X3@_','_@X4@_')",
              "Data":["_&s1.dbTable&_","ReportTitle", "Laboratory Dir", "CLIA No", "Address"]
            }
          },
          "~locallySourcedContent":{
            "fn":"fetchFromDb",
            "args":{"uri":"_&s1.~sourceURI&_",
                 "q":"_&s1.s101.sectionContent.~impQ&_"
            },
            "argsAsObj":true
          },
          "LaboratorySummary":{
            "fn":"inst2",
            "args":{
              "Label":["%Laboratory: _ @X1@_","%Director: _@X2@_", "%CLIA No :_ @X3@_","%Address: _ @X4@_"],
               "Data":"_&s1.s101.section Content.~locally SourcedContent&_"
            },
            "toArr":"%"
          }
        }
      },
      "s102":{
        "Title": "Patient Information",
        ...
      }
    }
  }
}
```

TABLE Ex1

```
{
  's1.SectionName': 'Header',
  's1.Title': 'Gene Expression Analysis',
  's1.~sourceConf.dbFilePath': 'C:/Users/.../myDb.sqlite',
  's1.~sourceConf.dbURIScheme': 'odbc',
  's1.~sourceURI.fn': 'toUri',
  's1.~sourceURI.args.dbFilePath': '_&s1.~sourceConf.dbFilePath&_',
  's1.~sourceURI.args.dbURIScheme': '_&s1.~sourceConf.dbURIScheme&_',
  's1.dbTable': 'GeneExprAnalysis_metaData',
  's1.s101.Title': 'Laboratory Information',
  's1.s101.sectionContent.~impQ.fn': 'inst2',
  's1.s101.sectionContent.~impQ.args.Label': "SELECT propertyValue FROM _@dbTable@_
WHERE property IN ('_@X1@_','_@X2@_','_@X3@_','_@X4@_')",
  's1.s101.sectionContent.~impQ.args.Data': ['_&s1.dbTable&_', 'ReportTitle', 'Laboratory Dir',
'Address', 'CLIA No'],
  's1.s101.sectionContent.~locallySourcedContent.fn': 'fetchFromDb',
  's1.s101.sectionContent.~locallySourcedContent.args.uri': '_&s1.~sourceURI&_',
  's1.s101.sectionContent.~locallySourcedContent.args.q':
'_&s1.s101.sectionContent.~impQ&_',
  's1.s101.sectionContent.~locallySourcedContent.argsAsObj': true,
  's1.s101.sectionContent.LaboratorySummary.fn': 'inst2',
  's1.s101.sectionContent.LaboratorySummary.args.Label': ['%Laboratory: _ @X1@_',
'%Director: _ @X2@_', '%Address: _ @X3@_', '%CLIA No: _ @X4@_'],
  's1.s101.sectionContent.LaboratorySummary.args.Data':
     '_&s1.s101.sectionContent.~locallySourcedContent &_',
  s1.s101.sectionContent.LaboratorySummary.toArr': '%'
  's1.s102.Title': 'Patient & Case Information',
  's1.s102.sectionContent.~impQ.fn': 'inst2',
  's1.s102.sectionContent.~impQ.args.Label': "SELECT propertyValue FROM _@dbTable@_
WHERE property IN ('_@X1@_','_@X2@_','_@X3@_','_@X4@_')",
  's1.s102.sectionContent.~impQ.args.Data': [ '_&s1.dbTable&_', 'Patient Name', 'MRN',
'SampleId', 'Run' ],
  's1.s102.sectionContent.~locallySourcedContent.fn': 'fetchFromDb',
  's1.s102.sectionContent.~locallySourcedContent.args.uri': '_&s1.~sourceURI&_',
  's1.s102.sectionContent.~locallySourcedContent.args.q':
'_&s1.s102.sectionContent.~impQ&_',
  's1.s102.sectionContent.~locallySourcedContent.argsAsObj': true,
  's1.s102.sectionContent. PatientSummary.fn': 'inst2',
  's1.s102.sectionContent.PatientSummary.args.Label': ['%Patient Name: _ @X1@_, '%MRN:
_@X2@_', '%SampleId: _ @X3@_', '%Run: _ @X4@ '
  ],
  's1.s102.sectionContent.PatientSummary.args.Data':
'_&s1.s102.sectionContent.~locallySourcedContent&_',
  's1.s102.sectionContent.PatientSummary.toArr': '%'
}
```

This Script comprises several of the elements described above, notably including these function references, at keys or paths with suffix 'fn':

toUri, at s1.~ sourceUri.fn, for generating a Universal Resource Identifier ('uri'), given a path to the resource and a uri scheme, both referenced here by updateVars in the arguments object that point to the values at s1.~sourceConf, where the uri scheme odbc signifies a file holding a SQLite database. The tilde indicates that this property is to be omitted from the finalized data container. Execution of this function creates a new entry in the WorkingObject at the parent path of the function reference, paired with the completed uri, thus "s1.~sourceURI": "odbc:///C:/Users/ . . . /myDb.sqlite";

inst2, at s1.s101.sectionContent.impQ.fn, for instantiating the templated SQL expression, at . . . args. Label, by substituting for the constituent subVars the items provided, in the expected order, in the array at . . . args.Data, having first instantiated the updateVar '_&s1.dbTable&_'; simply listing the string 's1.dbTable' in the argument list, rather than the updateVar, would replace the subVar _@dbTable@_ by that string, rather than the value stored in the WorkingObject under the that key, illustrating that even when entries already exist in the WorkingObject, it is the updateVar that makes it possible to reference it; the properly instantiated query is inserted into the WorkingObject, at the parent path of the function reference, thus: "s1.s101.sectionContent.~ impQ": "SELECT property Value FROM GeneExpr Analysis_metaData WHERE property IN ('ReportSubTitle', 'Laboratory Director', 'Address', 'CLIA No')"; while here provided as literals (including one update Var), the value of Data more generally will be sourced;

fetchFromDb, at s1.s101.sectionContent.~ locallySourcedContent.fn, for retrieving the intended data items by executing the now instantiated query, following instantiation of the updateVars in its arguments by back-reference to the new properties of the WorkingObject created in the previous two steps; argsAsObj directs the PROC Interpreter to pass arguments to fetchFromDb 'as-is', in the form of an object; once again, the output of this function is recorded as a new entry in the WorkingObject, at the parent path of the function reference, i.e., . . . ~locallySourcedContent; and inst2, at s1.s101.sectionContent.LaboratorySummary.fn, now invoked for producing labeled entries in the finalized version of the data container, by pairing the labels provided at . . . Label, with the corresponding values, newly created in the preceding step by invoking fetchFromDb, and back-referenced at . . . Data; here, toArr, with value '%', matching the leading character of the labels in the array at ... Label, directs the PROC Interpreter to display the instantiated items as individual strings, produced by splitting the full string returned by inst2 where indicated by the separator, '%'.

Accordingly, operating on the flattenend, path-encoded WorkingObject produced from the Script, execution comprises these steps:

create the uri for the intended data source and record it at ... ~ sourceURI then, for subsection s1.s101, execute these steps:

instantiate the import query, at ... impQ and record it at ... sectionContent.~ impQ;

referencing the uri and the import query and providing them in an argument object to fetchFromDb, as indicated by the formatting instruction argsAsObj, execute that function to retrieve the desired data from the local db at the specified uri and record the returned array at ... sectionContent.~ locally-SourcedContent;

instantiate the subVarExpression at ... LaboratorySummary.args.Label by referencing the array of data just retrieved and create an array of strings, as indicated by the formatting instruction toArr, namely to split the string returned by the query where indicated by the separator '%', each element of the array comprising a pair of descriptive label and data value, and record the array at ... section Content.LaboratorySummary, thus:

"s1.s101.sectionContent. LaboratorySummary':[
    'Laboratory: Molecular Diagnostics Laboratory, The Medical Center, TheCity, TheState',
    'Director: Paracelsus, MD',
    'CLIA No: 12X 1236789',
    'Address: TheNumber TheStreet, TheCity, TheState, TheZipCode'
]

proceed likewise for subsection s1.s102 following completion of these steps, optionally save the WorkingObject, which at this point represents a record of all steps performed during script execution, also referred to herein as an execution log or a process log; then remove from the execution log all entries marked by a tilde (Table Ex1.1) or marked by an underscore to obtain the populated data container (Table Ex1.3 & 1.4) with the intended structure, namely that specified in the PROC Script, here comprising one section and two subsections, holding the intended sourced content.

TABLE Ex1.3

```
{
  DOC: {
    's1.SectionName': 'Header',
    's1.Title': 'Gene Expression Analysis',
    's1.dbTable': 'GeneExprAnalysis_metaData',
    's1.s101.Title': 'Laboratory Information',
    's1.s101.sectionContent.LaboratorySummary': [
      'Laboratory: Molecular Diagnostics Laboratory, The Medical Center, TheCiry, TheState,',
      'Director: Paracelsus, MD,',
      'CLIA No: 12X 1236789,',
      'Address: TheNumber TheStreet, TheCity, TheState, TheZipCode'
    ],
    's1.s102.Title': 'Patient & Case Information',
    's1.s102.sectionContent. PatientSummary': [
      'Patient Name: Peter Pan,',
      'MRN: pk1234,,
      'SampleId: 1024,,
      'Run: pk1234-5678'
    ]
  }
}
```

To retrieve information from a remote data store requires only a minor modification of the Script in Table Ex1.1, namely: replacing sourceConf and sourceURI by the entries identifying the targeted REST-API and the remote database to be accessed; and replacing locallySourcedContent by remotelySourcedContent, as shown below, to identify the object referencing fetchByAPI:

```
"api":"some_REST_API",
"sourceDb":"sqlServerResourcesDb",
...
"remotelySourcedContent":{
   "fn":"fetchByAPI",
   "args":{"api":"_&s1.api&_", "sourceDb":"_&s1.sourceDb&_",
      "impQ":"_&s1.s101.sectionContent.impQ&_",
      "destDb":"_&s1.sourceDb&_","txnQ":null
   },
   "argsAsObj":true
}
```

The populated data container, in JSON format, may be electronically transmitted by standard protocols using JSON as the preferred data interchange format; it also may be imported into JSON document databases such as MangoDb (REF: websites mongodb.com under languages/what-is-json_or CouchDb REF: couchdb.apache.org/); likewise for the execution log. Further, for distribution, the data container may be transformed, for example by way of JavaScript libraries, to other file formats including but not limited to: XML (REF: npmjs.com website under package/xml-js); HTML (REF: json2html.com website); or PDF (REF: pdf-lib.js.org website).

In other embodiments, the structured data container may be referenced in an HTML document for display in a browser, preferably by invoking the standard fetch method, as part of a workflow, or in a subsequent process, for example by retrieving the structured data container from a document database. To that end, PROC expressions, such as subVarExpressions, optionally may include HTML tags; alternatively, a user-defined function may add such tags as needed.

E.2 An Advanced Workflow Pattern: Invoking External R Script & Retrieving Transformed Data The PROC Script fragment in Table Ex2.1 encodes a sequence of steps for deploying an external R script and retrieving its output from a csv file or a SQLite database table, depending on the value of a logical variable that is set within the R script and returned to the WorkingObject (below). In accordance with the general data flow in FIG. 1, the PROC Script first is converted to a flattened path-encoded WorkingObject; this is scanned for varExpressions, and any such expressions are expanded as described further below.

TABLE Ex2.1

```
{
"PROC":{
   "s1": {
      "SectionName":"Analysis via External R Script launched as Child Process",
      "Title":"Conditionally retrieve R Script Output from File or Database",
      "dbPath":"C:/Users/.../myDb.sqlite",
      "s101":{
         "Title":"Toy Model: External R Script Echoing Command Line Arguments",
         "~scriptOutpPath":{
            "fn":"runScriptObj",
            "args":{"script":"showArgs_3.R",
               "pathToRScript":["C:","Program Files","R","R-3.6.3","bin""x64"],
               "cmdLineArgs":["-runId=1025",
                  "-sampleId=pk4899-5756",
                  "-fnOut=C:/Users/Nitak/Desktop/cmdLineArgsEchoed.csv",
                  "-dbTb=cmdLineArgsEchoed_tmp"]
            },
            "argsAsObj":true,
            "valAsObj":true
         },
         "~scriptOutpURI":{
         "fn":"toUri",
         "args":{
            "uriScheme":{
               "fn":"ifelse",
               "args":{
                  "cond":"_&s1.s101.~scriptOutpPath.useFileOutp&_",
                  "x":"file", "y":"odbc"
               },
               "argsAsObj":true
            },
            "path":{
            "fn":"ifelse",
            "args":{
               "cond":"_&s1.s101.~scriptOutpPath.useFileOutp&_",
                  "x":"_&s1.s101.~scriptOutpPath.fnOut&_",
               "y":"_&s1.s101.~scriptOutpPath.dbTb&_"
            },
            "argsAsObj":true
            }
         }
      },
      "~fetchFn":{
         "fn":"createNewFnRef",
         "args":{
            "newFnArgs":{
```

TABLE Ex2.1-continued

```
            "fn":"ifelse",
            "args":{
              "cond":"_&s1.s101.~scriptOutpPath.useFileOutp&_",
              "x":{"uri":"_&s1.s101.~scriptOutpURI&_"},
              "y":{"uri":"_&s1.s101.~scriptOutpURI&_","q":"SELECT
                  * FROM
                  _&s1.s101.~scriptOutpPath.dbTb&_"}
            },
            "argsAsObj":true,
            "valAsObj":true
          },
          "newFnName":{
            "fn":"ifelse",
            "args":{
              "cond":"_&s1.s101.~scriptOutpPath.useFileOutp&_",
              "x": "fetchContent", "y": "fetchFromDb"
            },
            "argsAsObj":true
          }
        },
        "valAsObj":true
      },
      "RecoveredScriptOutp":{
        "fn":"_&s1.s101.~fetchFn.fn&_",
        "args":"_&s1.s101.~fetchFn.args&_",
        "valAsObj":true
      }
    }
  }
 }
}
```

Un-nesting-Nested function references, as encountered in this Example, relating to the function references toUri and createNewFnRef, are un-nested, in this case to obtain, from the nested sequence (below left) the un-nested sequence (below right) of function references, identified by paths ending in fn, wherein the entry at s1.s101.~ fetchFn. args.newFnArgs.args.y.q.fn, created programmatically upon expanding the updateVarExpression "SELECT * FROM _&s1.s101.~ scriptOutpPath.dbTb&_", in accordance with the pattern described herein above, points to the user-identified function inst2:

| Executing External R Script-For purposes of | |
|---|---|
| [ | [ |
| 's1.s101.~scriptOutpPath.fn', | 's1.s101.~scriptOutpPath.fn', |
| 's1.s101.~scriptOutpURI.fn', | 's1.s101.~scriptOutpURI.args.path.fn', |
| 's1.s101.~scriptOutpURI.args.uriScheme.fn', | 's1.s101.~scriptOutpURI.args.uriScheme.fn', |
| 's1.s101.~scriptOutpURI.args.path.fn', | 's1.s101.~scriptOutpURI.fn', |
| 's1.s101.~fetchFn.fn', | 's1.s101.~fetchFn.args.newFnName.fn', |
| 's1.s101.~fetchFn.args.newFnArgs.fn', | 's1.s101.~fetchFn.args.newFnArgs.args.y.q.fn', |
| 's1.s101.~fetchFn.args.newFnName.fn', | 's1.s101.~fetchFn.args.newFnArgs.fn', |
| 's1.s101.~fetchFn.args.newFnArgs.args.y.q.fn', | 's1.s101.~fetchFn.fn', |
| 's1.s101.RecoveredScriptOutp.fn' | 's1.s101.RecoveredScriptOutp.fn' |
| ] | ] | illustration, the R Script in Table Ex2.2 implements a simple task, namely to create a table holding its command line arguments, shown in Table Ex2.3, and writing that table to a csv file and to a SQLite database table; the path to the output file as well as the name of the intended database table are specified as command line arguments, while the path to the file holding the SQLite database is here specified at the top of the PROC Script; in a preferred embodiment, this and other such information may be retrieved from a configuration file by way of the user-defined function fetchContent.

The PROC Script invokes the user-defined function runScriptObj to spawn a child process that executes the R script in Table Ex2.2 with the command line arguments specified in the PROC Script, wherein the format of the strings in the array at . . . cmdLineArgs is that expected by the base R function commandArgs; runScriptObj captures output sent by the R Script to stdout, converts it to an object, and returns this to the WorkingObject, where, by default, it is recorded at s1.s101.~ scriptOutpPath. Following this update, the Working Object is re-flattened to produce full-length paths to the properties of the newly inserted object. In a preferred embodiment wherein the PROC Interpreter is a JavaScript program, runScriptObj invokes the function execSync in lib/child_process.js, further described at (REF: nodejs.org website under/api/child_process.html), or related functions within that module.

TABLE Ex2.2

```
# convert v of strings holding 'name=value' pairs to named list
# accepts: vs = vector of strings
# returns: named list of args
toL <- function(vs, sep = "=") {
   L <- lapply(strsplit(vs, sep), "[", 2)
   names(L) <- gsub("^\\-","",sapply(strsplit(vs, sep), "[", 1))
   return(L)
}
L <- toL(commandArgs(trailingOnly=T))
L <- c(L,list(useFileOutp='false')) # set useFileOutp to 'true' or 'false'
print(L)
df <- cbind.data.frame(names=names(L),values=unlist(L),row.names=NULL)
if(any(grepl("fnOut",names(L)))) { # write to file
   write.csv(df,L$fnOut)
}
if(any(grepl("dbTb",names(L)))) { # write to db
   library(RSQLite);
   dbPath <- "C:/Users/.../myDb.sqlite"
   con <- dbConnect(RSQLite: SQLite( ),dbPath)
   dbWriteTable(con,L$dbTb,df,row.name=FALSE,overwrite=TRUE,append=FALSE)
   dbDisconnect(con);
}
```

TABLE Ex2.3

| rowid | names | values |
|---|---|---|
| 1 | runId | 1025 |
| 2 | sampleId | pk4899-5756 |
| 3 | fnOut | C:/Users/Nitak/Desktop/cmdLineArgsEchoed.csv |
| 4 | dbTb | cmdLineArgsEchoed_tmp1 |
| 5 | useFileOutp | true |

Retrieving Transformed Data From Dynamically Created Source—The output generated by the R Script is retrieved, from either the csv file or from the database table, conditioned upon the value of useFileOutp in the object returned by runScriptObj, by executing the further instructions in the PROC Script.

Proceeding in accordance with the un-nested sequence of function references, the further execution comprises these steps:

conditioned upon the value of useFileOutp, at the path (following re-flattening) s1.s101.~ scriptOutpPath.useFileOutp, construct the appropriate uri by invoking the function ifelse to select the intended uri scheme, as well as to select the corresponding path to the data source, and record the uri at ~scriptOutpURI;

likewise conditioned upon the value of useFileOutp, invoke the user-defined special function createNewFnRef to create a new function reference comprising the selected fetch function with its requisite arguments, both selected by invoking ifelse, and record this new function reference object in the WorkingObject at the path ending in fetchFn; as with the previous instance, following insertion of a new object, (re-) flatten the WorkingObject to produce full-length paths to the properties of the newly recorded object; and finally, invoke the selected fetch function to instantiate the function reference at the path ending in RecoveredScriptOutp.fn with the function reference and corresponding arguments introduced by completion of the previous step, both back-referenced here by update Vars, to recover the table created by the R script from the specified SQLite database.

The populated structured data container so produced is shown in Table Ex2.4 and, in un-flattened form, in Table Ex2.5

TABLE Ex2.4

```
{
  's1.SectionName': 'Analysis via External R Script launched as Child Process',
  's1.Title': 'Conditionally retrieve R Script Output from File or Database',
  's1.dbPath': 'C:/Users/.../myDb.sqlite',
  's1.s101.Title': 'Toy Model: External R Script Echoing Command Line Arguments'
  's1.s101.RecoveredScriptOutp': [
      { names: 'runId', values: '1025' },
      { names: 'sampleId', values: 'pk4899-5756' },
      {names: 'fnOut', values: 'C:/Users/Nitak/Desktop/cmdLineArgsEchoed.csv'},
      { names: 'dbTb', values: 'cmdLineArgsEchoed_tmp' },
      { names: 'useFileOutp', values: 'false' }
  ],
}
```

TABLE Ex2.2

```
{
  PROC: {
    s1: {
      SectionName: 'Analysis via External R Script launched as Child Process',
      Title: 'Conditionally retrieve R Script Output from File or Database',
      dbPath: 'C:/Users/.../myDb.sqlite',
      s101: [Object]
    }
  }
}
```

E.3 Using Higher-Order & Anonymous Functions

This PROC Script fragment illustrates the sequential execution of two higher-order functions to illustrate iteration and filtration:

```
{
  "s1": {
    "SectionName":"Higher Order Functions",
    "Title":"Illustrating procMap & procFilter",
    "uriArray":{
      "fn":"procMap",
      "args":["toUri",[
          {"path":"www.json.org/json-en.html","uriScheme":"https"},
          {"path":"C:/Users/.../scripts/higherOrdFn_Script.json","uriScheme":"file"},
          {"path":"C:/Users/.../data/myDb.sqlite","uriScheme":"odbc"}],[ ]]
    },
    "filteredUriArray":{
        "fn":"aprocFilter",
        "args":["(x) => x.includes('odbc')","_&s1.uriArray&_",[ ]]
    }
  }
}
```

First, procMap, applies the registered user-defined function toUri, introduced in a previous Example, to an array of arguments and returns an array of uri strings that is recorded in the WorkingObject under the key s1.uriArray, as:

[
  'https://www.json.org/json-en.html',
  'file:///C:/Users/ . . . /scripts/higherOrdFn_Script.json',
  'odbc:///C:/Users/ . . . /data/myDb.sqlite'
]

Next, following instantiation of the updateVar_&s1.uriArray&_in its argument list, procFilter, here modified so as to accommodate an anonymous function expression, as indicated by the prefix a, in aprocFilter, applies the expression, "(x)=>x.includes ('odbc')", to uriArray and returns a filtered version of uriArray that, in this case, holds a single matching element:

[
  'odbc:///C:/Users/ . . . /data/myDb.sqlite'
]

The anonymous function expression, in a form intended for a preferred embodiment wherein the PROC Interpreter is a JavaScript program, evaluates to an anonymous JavaScript arrow function that returns: true or false depending on the outcome of testing the string provided as an argument, x, for the presence of odbc; analogous anonymous function expressions may be defined for other embodiments wherein the PROC Interpreter is a program in a language that supports the evaluation of expressions.

E.4 Interpreting Gene Expression Data by Integrated Gene Set Enrichment Analysis.

PROC permits the encoding of a data container structured in accordance with the requirements of a clinical laboratory report, comprising sections and subsections including but not limited to: patient information, performing laboratory information, test results, interpretation, test method description and disclaimers; and the encoding of a workflow that augments the reporting of results with interpretation based on analysis in the course of producing the report. This is illustrated here by invoking an R script to perform gene set analysis and including or referencing output created by the R script in the report.

Pathway Enrichment Analysis—Differential gene expression patterns, as determined in certain diagnostic tests that deploy large sets (aka 'panels') of genes selected for their (presumed) relevance to certain diseases or conditions, find increasing application in the clinical setting. To construct gene panels, sets of genes known or suspected to be associated with biological pathways of interest, are selected with the objective of aiding the prediction of clinical outcomes and guiding treatment selection. Particularly informative is a method of gene set (aka pathway) enrichment analysis that proceeds by ranking genes by (log 2 of normalized) expression level and determining, one gene set at a time, the degree of clustering of genes within that set at the high or low end of the ranking, the former indicating enrichment, the latter indicating depletion.

Integrated Pathway Enrichment Analysis via PROC—Specifically, given: a panel of typically at least several dozen genes, each gene associated with one or more pathways of interest, and so labeled, wherein pathways of interest to oncology may include: apoptosis, cell cycle control, DNA DoubleStrand Break Repair, G-Protein-Coupled-Receptor mediated Signaling, Interferon Signaling, Oncogenic MAP Kinase Signaling, PD1 Signaling and others; and a data set comprising expression levels for a multiplicity of samples, an R script is invoked to perform the enrichment analysis by executing these steps:

group genes by pathway, thereby defining gene sets, wherein genes may be associated with one or more pathways;

normalize expression levels, by computing z-values, using for each gene the mean and variance over the sample set;

for each sample, rank genes by z-value (or log 2 (z)) and proceed as follows:

for each pathway, perform the enrichment analysis by
  determining the degree to which high or low rankings may be over-represented in the set of pathway-associated genes vis-à-vis those in the complement, by computing an enrichment score from the (preferably unweighted) Kolmogorov-Smirnov order statistic, as defined in eqs 5 & 6 of (REF: pathwaycommons.org website under guide/primers/data_analysis/gsea/); and
  computing a p-value for the degree of enrichment (or depletion), preferably by way of the minimal hypergeometric test, in R package mHG available at the Comprehensive R Archive Network ('CRAN');

visualize the results of the enrichment analysis by:
  generating a table showing pathways ranked by the p-value indicating enrichment or depletion and save it to a location in the file system or to a database table specified via command line arguments to the R Script, as in Example 2;
  generating a bargraph, in SVG format, preferably using the R package svglite, available at CRAN, to display pathways ranked in descending order by p_mHG and the bars color-coded to indicate enrichment or depletion, and save it to a specified location in the file system;
  optionally, for a selected individual sample, generating, for each pathway, the empirical cumulative distribution function displaying the measures defined in eqs 5 & 6 of the aforementioned reference and save these visualizations in SVG format to a specified location in the file system;

retrieve the aforementioned table, or a portion thereof, for presentation in the structured data container, as described in Example 2; and optionally, retrieve the paths to the locations of SVG objects for inclusion in the structured data container, preferably in a format facilitating the subsequent loading of these SVG objects into an HTML-rendered version of the structured data container;

E.5 Interpreting Gene Variant Data by Information Harvested from Web Pages

A PROC Script encoding a clinical report of a diagnostic test for detecting gene variants can launch one or more R Scripts for harvesting related information of clinical interest. Thus, clinical decisions based on the detection of gene variants in a diagnostic test, for example in the clinical setting of oncology, are aided by considering a clinical significance score of any such variant, available in several public databases including ClinVar, though clinically validated information, as in clinicalgenome.org, remains scarce. These resources undergo continual evolution as new variants are recorded and the significance of existing variants is re-assessed. Further, in view of the expressed preference of US health insurers, the assembled report preferably will reference information guiding the selection of an approved treatment targeting specific variants, a list of such treatments being maintained by the National Cancer Institute.

Integrated Mining of Web Resources via PROC—As with the automated interpretation of gene expression analysis, the harvesting of such information may be orchestrated by way of a PROC Script, in this case by invoking several R scripts for mining selected web resources for relevant content and placing that content into a structured data container or a pre-specified database. Specifically, R scripts extract selected content from designated web pages, including links to related resources, by way of XPath queries, using the R package xml2, available at CRAN. In a preferred embodiment, several R modules inter-operate to mine multiple web-resources, for example as illustrated in FIG. 2, and compile content in a PROC configured structured data container of the invention; this is akin to the operation of software agents, wherein the operation of these agents is coordinated here by way of the PROC Script.

E.6 Staged Processing & PROC JOIN Operation

Execution of the first workflow, encoded by the PROC Script in Table Ex6.1, comprises instantiating import and transformation queries and related items that are referenced by substitution variables in the second PROC Script, in Table Ex6.2, comprising a templated jCode directive that is intended for communicating with a remote data store (REF: US20220121807A1, incorporated by reference). Here, the configuration of the data container encoded by the first PROC Script must record values produced by Script execution under the requisite keys referenced in the second Script.

TABLE Ex6.1

```
{
  "drvInp": {
    "tag":"chainedSelfJoin_4",
    "sourceTb": "Vars_PDx_XXX_9873",
    "impQ": {
      "fn":"inst2",
      "args":{"Label":"SELECT * FROM _@X@_","Data":["_&drv.sourceTb&_"]}
    },
    "targetTb":{
      "fn":"inst2",
      "args":{"Label":"_@X@_@Y@_","Data":["_&dry.sourceTb&_","_4c"]}
    },
    "~txnQDetail":{
      "txnType":"xcsj",
      "QueryData":{
        "fn":"get_csjData4",
        "args":{"tb":"_&targetTb&_"},
        "valAsObj":true
      },
      "Query":{
        "fn":"csjQuery",
        "args":{"qData":"_&~txnQDetail.QueryData&_"},
        "valAsObj":true
      }
    },
    "txnQ":"_&~txnQDetail.Query&_"
  }
}
```

TABLE Ex6.2

```
{
  "drv": {
    "instructionType": "manageData",
    "sourceType": "database",
    "sourceDatabase": "sqlServerResourcesDb",
    "importQuery": "_@impQ@_",
    "outputFormat": "json",
    "dataRepresentation": "wide",
    "targetDatabaseTableName": "_@targetTb@_",
    "transformationQueries": ["_@txnQ@_"],
    "destinationDatabase": "sqlServerResourcesDb",
    "persistenceMode": "overwrite",
    "tag": "_@tag@_"
  }
}
```

Accordingly, execution of the first PROC Script, in Table Ex6.1, comprises:
  instantiating the import query, at impQ, once again by the pattern of first instantiating the constituent updateVar, by referencing the value at sourceTb, here provided as a literal, but more generally retrieved from an external source such as a configuration file, and then instantiating the subVars in the constituent templated expression, here a SQL expression, by invoking the user-defined function inst2;
  instantiating the transformation query, to be recorded at txnQ, here by dynamically creating a SQL expression comprising chained self-joins ('csj'), by invoking application-specific user-defined functions, as follows:
    in a first step, invoking the user-defined function get_csjData4, where the numeral '4' indicates the number of columns in the intended wide table to be returned by the transformation query below, to procure inputs to be consumed in forming the query expression, and recording the object returned by that function at ~txnQDetail.QueryData; here, as before, the tilde represents a filtering instruction; and,
    in a second step, invoking the user-defined function csjQuery, to assemble the actual transformation query expression with arguments procured in the previous step, and recording this chained-self join SQL expression at ~txnQDetail.Query;
  finally, assigning this completed transformation query txnQ.

Populating the first data container produces the object in Table Ex6.3, comprising values under keys matching the subVar names in the templated jCode directive of the second data container, in Table Ex6.2. This jCode directive is populated by a PROC JOIN operation, comprising retrieving values from the first data container under keys matching subVar names in the second data container. This operation produces the populated jCode directive in Table Ex6.4, suitable for submission as part of a REST-API request.

TABLE Ex6.3

```
{
  drvInp: {
    impQ: 'SELECT * FROM Vars_PDx_XXX_9873',
    sourceTb: 'Vars_PDx_XXX_9873',
    tag: 'chainedSelfJoin_4',
    targetTb: 'Vars_PDx_XXX_9873_4c',
    txnQ: "SELECT a.propVal AS id,g.propVal AS GeneSymbol,b.propVal AS
gSyntax,c.propVal AS pSyntax,d.propVal AS transcSyntax FROM
Vars_PDx_XXX_9873_4c_temp a JOIN Vars_PDx_XXX_9873_4c_temp g ON
INSTR(b.uniquePropPath,('4-' || a.parentRecordNo)) > 0 AND a.propKey = 'id' AND b.propKey
= 'gSyntax' LEFT JOIN Vars_PDx_XXX_9873_4c_temp b ON INSTR(c.uniquePropPath, ('4-' ||
a.parentRecordNo)) > 0 AND a.propKey = 'id' AND c.propKey = 'pSyntax' AND
```

TABLE Ex6.3-continued

```
INSTR(c.propPath,'cSyntaxes[0]') > 0 JOIN Vars_PDx_XXX_9873_4c_temp c ON
INSTR(d.uniquePropPath,('4-' || a.parentRecordNo)) > 0 AND a.propKey = 'id' AND d.propKey
= 'transcSyntax' AND INSTR(d.propPath,'cSyntaxes[0]') > 0 JOIN
Vars_PDx_XXX_9873_4c_temp d ON INSTR(g.uniquePropPath, ('4-' || a.parentRecordNo)) > 0
AND a.propKey = 'id' AND g.propKey = 'symbol' AND INSTR(g.propPath, 'cSyntaxes[0]') > 0"
    }
}
```

TABLE Ex6.4

```
[
  {
    instructionType: 'manageData',
    sourceType: 'database',
    sourceDatabase: 'sqlServerResourcesDb',
    importQuery: 'SELECT * FROM Vars_PDx_XXX_9873',
    outputFormat: 'json',
    dataRepresentation: undefined,
    targetDatabaseTableName: 'Vars_PDx_XXX_9873_4c',
    transformationQueries: [
      "SELECT a.propVal AS id,g.propVal AS GeneSymbol,b.propVal AS gSyntax,c.propVal AS
pSyntax,d.propVal AS transcSyntax FROM Vars_PDx_XXX_9873_4c_temp a JOIN
Vars_PDx_XXX_9873_4c_temp g ON INSTR(b.uniquePropPath,('4-' || a.parentRecordNo)) > 0
AND a.propKey = 'id' AND b.propKey = 'gSyntax' LEFT JOIN Vars_PDx_XXX_9873_4c_temp
b ON INSTR(c.uniquePropPath,('4-' || a.parentRecordNo)) > 0 AND a.propKey = 'id' AND
c.propKey = 'pSyntax' AND INSTR(c.propPath,'cSyntaxes[0]') > 0 JOIN
Vars_PDx_XXX_9873_4c_temp c ON INSTR(d.uniquePropPath,('4-' || a.parentRecordNo)) > 0
AND a.propKey = 'id' AND d.propKey = 'transcSyntax' AND INSTR(d.propPath,'cSyntaxes[0]')
> 0 JOIN Vars_PDx_XXX_9873_4c_temp d ON INSTR(g.uniquePropPath, ('4-' ||
a.parentRecordNo)) > 0 AND a.propKey = 'id' AND g.propKey = 'symbol' AND
INSTR(g.propPath, 'cSyntaxes[0]') > 0"
    ],
    destinationDatabase: 'sqlServerResourcesDb',
    persistenceMode: 'overwrite',
    tag: 'chainedSelfJoin_4'
  }
]
```

In the context of PROC JOIN, subVars in a second data container thus reference matching keys in a first data container, in a manner analogous to that of updateVars in a given data container referencing values by matching keys in the same data container.

Remote Sourcing—Submitting the instantiated jCode directive, in this second PROC Script, as a REST-API request, preferably by invoking the user-defined function fetchByAPI, first selects specific data from the identified table of the targeted remote data store, in a certain generic tabular representation, and then applies a transformation query to this selection, recover from the generic tabular representation the intended wide tabular format comprising columns specified in the csj-query. This pattern of populating templated jCode directives also applies to tasks such as creating or updating remote data stores.

The specific methods, procedures, and examples described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The invention has been described broadly and generically herein. Each of the narrower species and subgeneric groupings falling within the generic disclosure also form part of the invention. The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method for configuring and populating a structured data container to automate the creation of a structured information product, for recording, presenting and conveying items of information acquired from disparate internal and external sources, comprising:
   providing a script including an original code for simultaneously encoding a structured data container and a sequence of instructions for populating the data container, the script conformant to a key: value pair syntax and including:
      variables of at least a first type capable of being instantiated by back-referencing entries provided or created during code execution;
      references to user-defined functions or function expressions capable of being executed;
      optionally, function argument and function return value formatting instructions; and
   executing the original code, by a code interpreter, to populate the structured data container, including:
      transforming the original code into a flattened, path-encoded WorkingObject;
      executing referenced user-defined functions, in un-nested sequence, to produce function return values;
      recording the function return values in the WorkingObject, thereby updating said WorkingObject;
      instantiating variables of the first type by referencing the function return values or values otherwise provided in theWorkingObject;
      selecting from the WorkingObject items for inclusion in a structured data container intended for electronic transmission or transformation to second formats; and, thereby,
   generating a structured information product, having items of information acquired from disparate internal and external sources.

2. The method of claim 1 wherein the original code has a representation as a nested object.

3. The method of claim 1 wherein expressions comprising variables of the first type are transformed by syntax substitution.

4. The method of claim 3 wherein variables of the first type are update variables.

5. The method of claim 1 wherein the script provides variables of at least a second type, said variables instantiated by substitution of values referenced or provided in the WorkingObject.

6. The method of claim 1 wherein code execution comprises invoking user-defined functions and instantiating variables of at least a first or a second type.

7. The method of claim 6 wherein user-defined functions are invoked by name or alias by referencing a function dispatch object wherein user-defined functions are registered.

8. The method of claim 7 wherein registering a user-defined function means entering a new key: value pair into the function dispatch object, wherein value is the function name, and key is an alias which may be identical to the function name.

9. The method of claim 6 wherein user-defined functions comprise functions in categories including but not limited to: fetch & put functions; control flow functions; higher-order functions; transmission functions; functions for creating new function references; and functions for performing syntax substitutions.

10. The method of claim 1 wherein populating comprises executing a sequence of instructions encoding an end-to-end process that is completed in real-time.

11. The method of claim 1 wherein populating comprises a first and a second stage wherein the second stage is initiated with or without delay after completion of the first stage.

12. The method of claim 11 wherein the populated data container of a first stage provides the source for instantiating a data container of a second stage.

13. The method of claim 12 wherein instantiating comprises a PROC JOIN operation matching substitution variables in the data container of the second stage to keys in the data container of the first stage.

14. The method of claim 1 wherein the code is a Document Origination Code.

15. The method of claim 1 wherein the populated structured data container is an execution log.

16. The method of claim 1 wherein the populated structured data container is filtered to produce an information product.

17. The method of claim 16 wherein the information product is suitable for electronic transmission.

18. The method of claim 16 wherein the information product, in a first format, may be transformed to second formats.

19. A method for simultaneously encoding a process for compiling and transforming items of information from one or more sources, and configuring a structured data container for recording and presenting said items or items derived therefrom, the method comprising:
   providing a script comprising an executable process orchestration and structured data container configuration code, conformant to key: value pair syntax, the code comprising:
      variables of at least a first type capable of being instantiated by back-referencing entries existing or anticipated to be existing in the script, or an object derived therefrom upon script execution;
      references to user-defined functions or function expressions, capable of being executed;
      optionally, function argument and function return value formatting instructions;
   wherein the code has a representation as a nested object and wherein executing the code results in forming a structured data container presenting said recorded items.

20. A method for acquiring and presenting information from distributed data sources, comprising:
   composing a templated executable script including:
      instructions for programmatically fetching items of information from designated said sources the instructions embedded in a nested object encoding a configuration of a structured document for recording the items of information;
   executing said instructions to retrieve items of information from designated internal or external sources in a decentralized data architecture and recording said retrieved items of information to populate the structured document; and
   wherein the populated structured document is a transmissible information product.

* * * * *